United States Patent
Jouhara et al.

(10) Patent No.: US 9,346,135 B2
(45) Date of Patent: May 24, 2016

(54) METHOD AND AN APPRATUS FOR CONSTRUCTING A HEAT PIPE

(75) Inventors: Hussam Jouhara, Manchester (GB); Richard Ian Meskimmon, Leicester (GB)

(73) Assignee: S&P Coil Products Ltd, Leicester (GB)

( * ) Notice: Subject to any disclaimer, the term of this patent is extended or adjusted under 35 U.S.C. 154(b) by 0 days.

(21) Appl. No.: 13/639,839

(22) PCT Filed: Apr. 8, 2011

(86) PCT No.: PCT/GB2011/000543
§ 371 (c)(1),
(2), (4) Date: Dec. 18, 2012

(87) PCT Pub. No.: WO2011/124890
PCT Pub. Date: Oct. 13, 2011

(65) Prior Publication Data
US 2013/0111756 A1  May 9, 2013

(30) Foreign Application Priority Data
Apr. 8, 2010 (GB) .................................. 1005861.8

(51) Int. Cl.
*B23P 15/26* (2006.01)
*B01D 19/00* (2006.01)
*F28D 15/02* (2006.01)

(52) U.S. Cl.
CPC ............. *B23P 15/26* (2013.01); *B01D 19/0031* (2013.01); *F28D 15/0283* (2013.01); *B23P 2700/09* (2013.01); *Y10T 29/49353* (2015.01); *Y10T 29/53* (2015.01)

(58) Field of Classification Search
CPC . B01D 19/0031; F28D 15/02; F28D 15/0283; B23P 156/26; B23P 2700/09
USPC ...................................... 29/890.032, 890.053
See application file for complete search history.

(56) References Cited

U.S. PATENT DOCUMENTS

| | | | | |
|---|---|---|---|---|
| 5,289,641 | A * | 3/1994 | Balamuta et al. | .................. 34/75 |
| 6,230,407 | B1 * | 5/2001 | Akutsu | ..................... 29/890.032 |
| 7,430,804 | B2 * | 10/2008 | Hou et al. | ................ 29/890.032 |
| 7,849,597 | B2 * | 12/2010 | Liu et al. | .................. 29/890.032 |

(Continued)

FOREIGN PATENT DOCUMENTS

| | | |
|---|---|---|
| EP | 1884993 | 2/2008 |
| EP | 2128549 | 12/2009 |
| JP | 57142485 | 9/1982 |
| JP | 2007064523 | 3/2007 |

OTHER PUBLICATIONS

Notification and Transmittal of the International Search Report and the Written Opinion of the ISA or the Declaration, mailed Dec. 30, 2011 in PCT/GB2011/000543.

(Continued)

*Primary Examiner* — Jason L Vaughan
(74) *Attorney, Agent, or Firm* — TechLaw LLP

(57) ABSTRACT

A method for constructing a heat pipe, comprising the steps of providing a tube having an open end and a opposite closed end; filling a tube with a predetermined volume of working fluid; connecting a vapor trap to the open end of the pipe; evacuating the tube for a predetermined period of time to remove non-condensable gases from the tube; and sealing the tube wherein the step of evacuating the tube includes the steps of applying a vacuum to the open end of the pipe.

12 Claims, 1 Drawing Sheet

(56) References Cited

U.S. PATENT DOCUMENTS

| | | |
|---|---|---|
| 2006/0000581 A1 | 1/2006 | Chen |
| 2006/0225282 A1 | 10/2006 | Chung |
| 2007/0062036 A1* | 3/2007 | Tung et al. ............... 29/890.032 |
| 2009/0308576 A1 | 12/2009 | Wang |
| 2010/0032138 A1 | 2/2010 | Chen |
| 2012/0255716 A1* | 10/2012 | Wu et al. ....................... 165/173 |
| 2013/0239410 A1* | 9/2013 | Chung et al. ............. 29/890.032 |

OTHER PUBLICATIONS

Search Report under Section 17(5), mailed Aug. 9, 2011 in GB1105951.6.
Notification of Transmittal of the International Preliminary Report on Patentability mailed Mar. 14, 2013 in PCT/GB2011/000543.
English translation of Office Action issued on related Chinese Pat. Appl. No. 2011800279809, Jul. 21, 2014, 9 pages.

* cited by examiner

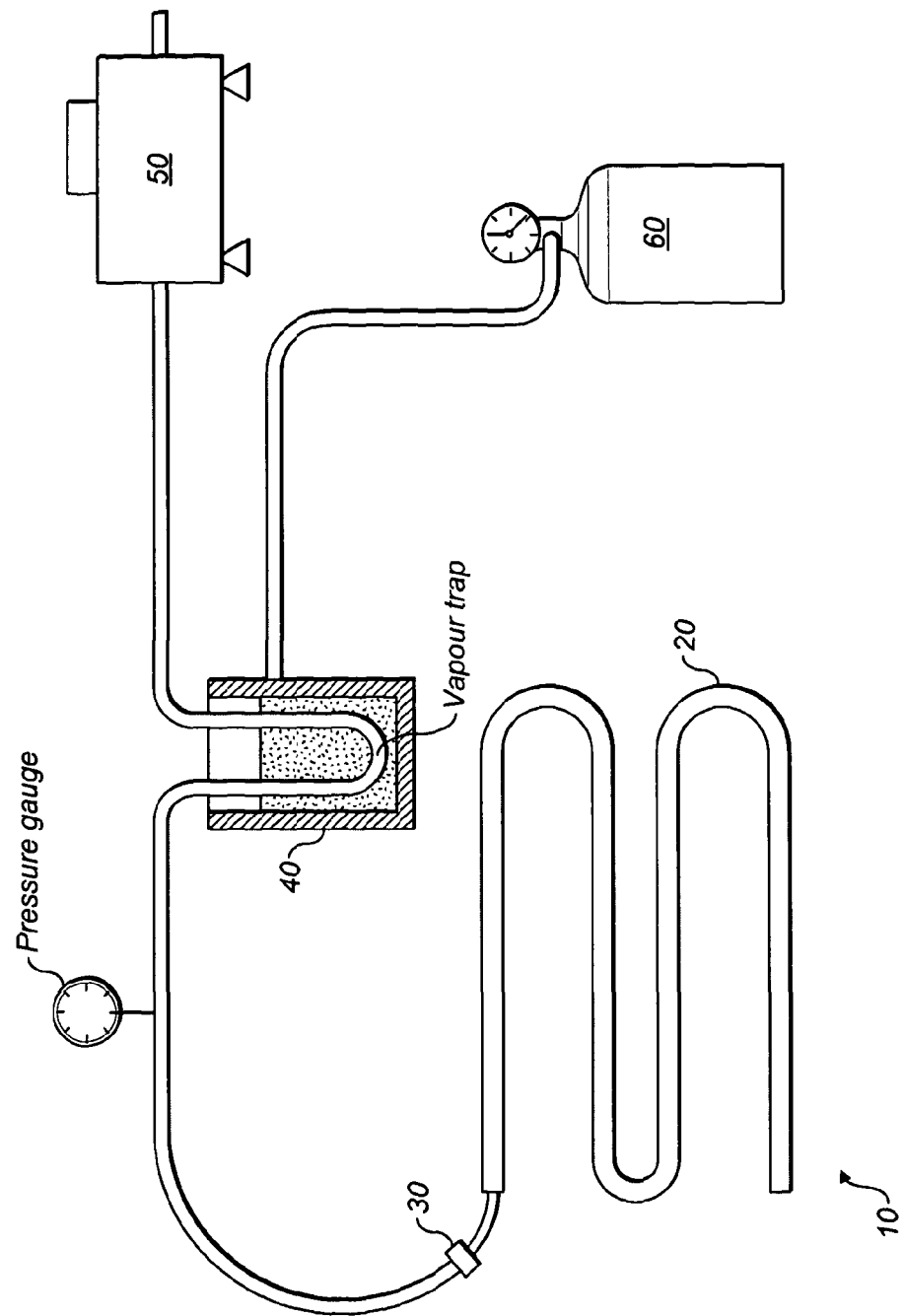

METHOD AND AN APPRATUS FOR CONSTRUCTING A HEAT PIPE

This invention relates to a method for constructing a heat pipe and to an apparatus for manufacturing such a heat pipe.

Heat pipes are an efficient means of transferring heat from one location to another.

A conventional heat pipe comprises a sealed hollow tube formed from a material having a high thermal conductivity, such as copper or an aluminum alloy, and partially filled with a working fluid. The heat pipe operates by means of the working fluid being held in its liquid and vapour states at its saturation point in quiescent air. This is achieved by ensuring that the heat pipe operates at the appropriate pressure and temperature conditions.

Applying heat to one end of the heat pipe causes the liquid to boil and enter the vapour state. In doing so, the liquid acquires its latent heat of vaporisation. The vapour formed at the warm end is at a higher pressure than the vapour at the cool end of the pipe, and moves along the pipe to the cooler location where it condenses and gives up its latent heat of vaporisation. The condensed liquid then flows back to the warm end of the heat pipe. Thus heat is transferred from a warm evaporating section to a cool condensing section.

The flow of the condensed working fluid from the cool end to the warm end normally occurs under the influence of gravity. This requires that the heat pipe be generally oriented such that the cool end is at a substantially higher level than the warm end.

However, an optional internal wick structure is often used to assist the return of the condensed fluid from the cool end back to the warm end of the heat pipe, by capillary action. The use of a wick structure makes it possible for the heat pipe to be oriented such that the cool end is either level with or higher than the warm end.

Wickless heat pipes relying on gravity return are capable of transferring the fluid at much higher rates than wicked heat pipes. They are also significantly simpler and less expensive to manufacture. The choice of working fluid is largely dictated by the temperature conditions under which the heat pipe is to operate. For example, very low temperature applications may employ liquid helium, while for very high temperatures, fluids such as mercury or sodium may be chosen. However, for most conventional heat pipe applications the working fluid will be refrigerant, ammonia, alcohol or water.

Water is often preferred as a working fluid since it is environmentally friendly and generally presents few hazards. It also has more attractive thermal properties than competing fluids, allowing each unit mass flow rate to transfer more heat.

A conventional heat pipe is fabricated by forming a tube into a desired configuration, such as a straight pipe or a loop, and sealing one end. The pipe is then filled with a predetermined volume of the working fluid.

Once the heat pipe has been partially filled with the working fluid, it is necessary to purge the pipe of all non-condensable gases. If these non-condensable gases are not removed they accumulate in the top of the heat pipe and can cause corrosion in combination with the working fluid. This has the effect of reducing the effective length of the heat pipe as the non-condensable gases block off the upper end of the heat pipe, and reduce the surface area of the condenser section and the rate at which vapours can be condensed. Consequently, the effectiveness of the heat pipe is reduced.

One technique for removing all non-condensable gases from a charged heat pipe is to heat the assembly until the working fluid boils. The resulting vapour then purges the non-condensable gases from the heat pipe, at which point the heat pipe is closed and sealed.

While this technique can readily be applied to small to medium sized heat pipe assemblies, which can easily be heated individually, it is impractical for large or irregularly shaped heat pipe assemblies. The technique is not capable of removing all the non-condensables from the pipe as a full purge can never be achieved.

In the technique described hereinabove, the heat pipe is filled with a working fluid before it is purged to removed the non-condensable gases.

In another known technique, a heat pipe is initially evacuated using a pump attached to the heat pipe by means of, for example, a valve. After evacuation by the pump, the pump is closed off from the heat pipe by means of the valve. The working fluid is then injected into the heat pipe. However, it is possible to inject the working fluid into the heat pipe only by breaking the vacuum created in the heat pipe in order to charge the working fluid.

Further, since the purging step takes place prior to the working fluid being injected into the heat pipe, any non-condensable gases contained in the working fluid are not removed.

This technique, which is commonly known as the Faghri method, is therefore incapable of fully removing all non-condensable gases.

Conventional methods and techniques for producing and filling heat pipes therefore cannot remove all the non-condensable gases, particularly for heat pipes which are large or have a complex or irregular configuration.

For many working fluids the presence of non-condensable gases is acceptable for certain applications particularly if the working fluid operates at positive pressures. However, when water is used as a working fluid, it operates at a sub-atmospheric pressure. This means that any non-condensable gases remaining in the heat pipe occupy a significantly greater volume of the heat pipe than they do with a working fluid which operates at a positive pressure.

A further problem which is encountered with conventional heat pipes is that of 'outgassing'. Outgassing is a phenomenon whereby gas which is trapped in solution in the material of the pipe slowly diffuses into the working fluid over time. This results in an accumulation of non-condensable gases in the heat pipe which reduces its effectiveness for the reasons outlined above.

According to a first aspect of the invention there is provided a method for constructing a heat pipe, comprising the steps of: providing a tube having an open end and a opposite closed end; filling a tube with a predetermined volume of working fluid; connecting a vapour trap to the open end of the pipe; evacuating the tube for a predetermined period of time to remove non-condensable gases from the tube; and sealing the tube, wherein the step of evacuating the tube includes the step of applying a vacuum to the open end of the pipe.

It is to be understood that the step of evacuating the tube to remove non-condensable gases from the tube includes the removal of non-condensable gases from the working fluid within the tube and the material from which the tube is made.

The removal of the non-condensable gases from the heat pipe improves its effectiveness and longevity for the reasons outlined above.

Optionally the working fluid is water.

Water may be used as the working fluid in some embodiments of the invention for several reasons. Firstly, water is environmentally friendly and generally poses no risk should the heat pipe develop a leak. Secondly, there are no safety risks associated with the use of water during the filling process. Thirdly, there are significant cost advantages to the use of water instead of, for example, ammonia or commercial refrigerants.

Fluids having similar properties to water may also be used as the working fluid in some embodiments of the invention. Within this specification a fluid is deemed to have similar properties to those of water if the fluid in question is exposed to temperatures below their boiling point at atmospheric pressure during use as a working fluid within a heat pipe. Such a fluid is described herein as a similar fluid to water.

Because the heat pipe contains no air and just a mixture of the working fluid in its liquid and vapour phase the pressure is not atmospheric but is equal to the vapour pressure of the fluid at the temperature to which it is exposed. If a water filled hear pipe is subjected to external temperatures below 100° then the saturated vapour pressure will be below atmospheric pressure and hence pressures within the pipe will be sub-atmospheric.

Examples of suitable working fluids are, for example, ethanol, methanol, acetone, ammonia and a range of proprietory water-based heat transfer fluids for use at sub-zero operating temperatures.

Common refrigerants such as refrigerant R134a tend not to be suitable for use as a working fluid in respect of the invention as claimed, because, inter alia they are used at pressures well in excess of atmospheric pressure.

The method according to a first aspect of the invention is thus particularly applicable to construction of a heat pipe in which the working fluid is water or a similar fluid, since as mentioned hereinabove, because water operates at a sub-atmospheric pressure, the presence of non-condensable gases within the pipe/fluid is not acceptable.

The step of evacuating the non-condensable gases from the tube maximizes the efficiency of the heat pipe by eliminating or reducing the presence of accumulated non-condensable gases, which may restrict its effective length.

Furthermore, a heat pipe produced by the invention does not suffer from the problem of 'outgassing' since these gases are drawn out of solution during the manufacturing process.

The invention may be applied to heat pipes of any size and/or configuration and can reliably remove substantially all non-condensable gases.

Optionally, the step of evacuating the tube to remove non-condensable gases from the tube comprises the step of applying a vacuum to the open end of the pipe.

The predetermined period of time during which the tube is evacuated is sufficient to remove substantially all of the non-condensable gases from the heat pipe and will vary depending upon the internal volume and geometrical configuration of the heat pipe, together with the ambient temperature and the evacuation method.

The predetermined period of time can be determined for any given heat pipe, taking into account the environment in which it is charged and the working fluid to be used.

The predetermined period of time may thus be determined by empirical means through experimentation involving fluids whose suitability for use as a working fluid is being investigated. Pressure versus time charts may thus be prepared to identify stages in the evacuation process.

The pressure measurements may be taken in the heat pipe itself, and hence reflect the sum of the partial pressures exerted by the working fluid vapour plus that of any non-condensable gases remaining within the heat pipe. In this way the time necessary to allow the pump to remove all non-condensable gases may be determined.

The removal of non-condensable fluids is indicated by the pressure within the heat pipe becoming constant. This occurs when the heat pipe is filled substantially by the working fluid in liquid and vapour form. The constant pressure is equal to the vapour pressure of the working fluid at the prevailing temperature of the heat pipe.

The invention therefore may comprise the step determining the predetermined period of time, prior to carrying out the step of evacuating the tube.

This step may be carried out at any convenient time, and may for example be carried out as a separate stage well before construction of the heat pipe is carried out. For example, the step of determining the predetermined period of time may be carried out at a different location, such as a laboratory to that at which the invention is carried out.

The predetermined period of time may be determined by any convenient method, and may include the step of measuring the pressure of the working fluid within the tube, and determining when the pressure of the working fluid becomes constant.

The time taken to achieve this constant pressure varies with the working fluid being investigated, and the operating temperature, and also the dimensions of the heat pipe such as length, and a mass of working fluid being used.

For a one meter long heat pipe filled with water, the time required to reach a constant pressure is approximately 30 minutes. The final constant pressure measured at, or towards the top of the heat pipe is close to 5 torr.

For a 2 meter long heat pipe filled with water, the time is likely to be around 35 minutes.

The final constant pressure achieved at a constant operating temperature is constant for a particular working fluid, but will increase with the heat pipe length and the mass of working fluid.

Any suitable pressure gauge may be used to measure the pressure for example electronic Pirani type pressure gauge may be used in order to measure the pressure with sufficient accuracy to enable identification of the onset of the final constant pressure regime.

Thus by means of embodiments of the invention it is possible to optimise the length of time for which the vacuum is applied to the heat pipe. This overcomes problems that may be associated when a vacuum is applied for too long, or too short a period of time.

For example, if the vacuum is applied to the heat pipe for too short a period of time, some of the non-condensable gases may remain in the heat pipe.

Conversely, if the vacuum is applied for too long a period of time, not only will all the non-condensable gases be drawn from the heat pipe, but an excess of the vaporised working fluid may also be removed. This may adversely affect the performance of the heat pipe.

Because the working fluid is already within the heat pipe when the evacuation process takes place, some of the fluid may vaporise during the evacuation process and may be carried out of the heat pipe.

For a one-meter water filled heat pipe, the loss of water during a 30 minute evacuation process is likely to be around 10% of the starting mass of the working fluid.

The mass of working fluid removed must be calculated for the heat pipe to be filled properly, and may be deduced by weighing the heat pipe before and after the evacuation process, and recording the mass loss.

The method according to embodiments of the invention may comprise the further step of weighing the tube after the step of filling the tube with the predetermined volume of working fluid, and before the step of evacuating the tube; re-weighing the tube after the step of evacuating the tube; and recording the mass of vaporised working fluid lost during the step of evacuating the tube.

Optionally, the step of applying a vacuum to the open end of the pipe comprises the step of connecting a vacuum pump to the open end of the pipe such that the vapour trap is interposed between the vacuum pump and the open end of the tube.

Whilst it is known to use a vacuum pump to draw the non-condensable gases from the interior volume of the heat pipe prior to sealing, the use of such a technique with a water or similar fluid filled heat pipe has previously not been feasible because of water vapour being drawn into the vacuum pump. This reduces the effectiveness of the vacuum pump seals and prevents the attainment of a vacuum in the heat pipe. This in turn results in the heat pipe having low performance.

By connecting the vacuum pump to the interior volume of the heat pipe via a vapour trap it is possible to remove residual water vapour from the gas before the gas is drawn through the vacuum pump. This prevents the water vapour from adversely affecting the level of vacuum which can be created in the heat pipe.

If the invention is carried out with a working fluid other than water, the inclusion of the vapour trap will not only ensure that the required vacuum is achieved, but will also trap fluid vapours which may otherwise catastrophically damage the vacuum pump.

The method may comprise the further initial step of cleaning the inner surface of the heat pipe.

This step means that debris and contaminants will be removed prior to the heat pipe being filled with the working fluid. This is advantageous since such debris and contaminants may result in non-condensable gases being generated. Debris will, in addition, coat the inner surface of the tubes reducing the efficiency of the evaporation and condensation and hence reducing the effectiveness of the heat pipe.

The step of sealing the tube may comprise the step of closing the open end to form a sealed heat pipe.

The heat pipe may be sealed by mechanically crimping the open end of the tube, by plugging the open end or by any other mechanical sealing technique.

The sealing process may result in a hermetically sealed heat pipe. An advantage of hermetically sealing the heat pipe is that condensable gases are prevented from re-entering the pipe and reducing the effectiveness of the heat pipe.

In an embodiment of the invention, the heat pipe comprises a matrix of straight tubes joined together to form loops. In this arrangement, one end of the tube is sealed and the other end is left open to provide access to the inner volume of the heat pipe. This will take the form of a matrix of tubes joined by, for example, 180° bends to form a single pipe constructed from a plurality of looped individual passes.

In alternative embodiments of the invention, the heat pipe may comprise a plurality of tubular elements which are each connected at their respective ends to a manifold. The manifolds are then provided with a single opening which provides access to the inner volume of the heat pipe.

According to a second embodiment of the invention there is provided an apparatus for manufacturing a heat pipe, comprising a tube having an open end and an opposite closed end, a vacuum pump connected to the open end of the tube, and a vapour trap interposed between the vacuum pump and the open end of the tube, wherein the heat pipe is filled with a predetermined volume of working fluid.

In some embodiments, the apparatus may be filled with a predetermined volume of fluid, which may be water, or fluid with similar properties.

The apparatus may comprise a pressure gauge operatively connected to the apparatus, which pressure gauge is adapted to measure the pressure within the tube.

The pressure gauge may be any suitable pressure gauge, and may for example comprise an electronic Pirani type pressure gauge.

There now follows a description of an embodiment of the invention, by way of non-limiting example, with reference being made to the accompanying drawing in which:

FIG. 1 is a schematic arrangement of an apparatus for producing a heat pipe according to an embodiment of the invention; and Referring to FIG. 1, an apparatus for producing a heat pipe 20 in accordance with an embodiment of the invention is designated generally by the reference numeral 10.

The heat pipe 20 may be fabricated to be of any size and/or configuration. A typical configuration is a loop arrangement as illustrated schematically in FIG. 1. The loop arrangement of the heat pipe 20, shown in FIG. 1, is typically approximately 0.2 m in length and 2 m long.

In alternative embodiments, the heat pipe may be formed, for example, as a linear pipe, a looped multi-pass pipe, a plurality of parallel tubes which are interconnected by manifolds, or in some other configuration.

The heat pipe 20 has a single charging point 30 providing access to the inner volume of the heat pipe 20.

After the initial fabrication, the heat pipe 20 is flushed to remove any debris remaining from the manufacturing process and to thoroughly clean the inner surfaces of the tube.

Following cleaning, the heat pipe 20 is partially filled with a predetermined volume of water. The predetermined volume is determined based upon the internal volume and the configuration of the heat pipe 20. This ensures that the evaporation end of the heat pipe has a continual film of liquid in its inner surface during operation.

The heat pipe 20 is then connected, via the charging point 30, to a vapour trap 40 and thence to a vacuum pump 50.

The vapour trap 40 is used to remove any residual water vapour from the gas that is drawn out of the heat pipe 20. The vapour trap 40 uses liquid nitrogen 60 to freeze the water vapour prior to the gas being drawn through the vacuum pump 50. Alternatively, dry ice may be used in the vapour trap 40 or alternatively a commercially available mechanical refrigeration trap. This prevents any residual water vapour from reaching the vacuum pump 50.

The vacuum pump 50 is then operated for a predetermined length of time. The predetermined time is determined by empirical analysis as explained herein above.

At the end of the predetermined time period, the vacuum pump 50 is switched off and the heat pipe 20 is sealed.

The foregoing method is described in relation to a heat pipe 20 which contains water as its working fluid. However, it is to be appreciated that the method of the invention is equally applicable to heat pipes 20 which use alternative liquids as their working fluid.

For the avoidance of doubt, it is to be understood that the process of evacuating the heat pipe in accordance with aspects of the present invention involves removal of non-condensable gases contained both in the pipe material forming the heat pipe, and in the working fluid contained in the tube.

The invention claimed is:

1. A method for constructing a wickless heat pipe, comprising the steps of:
   providing a tube having an open end and an opposite closed end;
   filling the tube with a predetermined volume of working fluid;
   connecting a vapor trap to the open end of the tube;

evacuating the tube by applying a vacuum to the open end of the tube for a predetermined period of time to remove non-condensable gases from the tube; then after filling the tube with a predetermined volume of working fluid; sealing the tube, weighing the tube after filling the tube with a predetermined volume of working fluid and before evacuating the tube;

re-weighing the tube after evacuating the tube, and recording the mass of vaporized working fluid lost during evacuation of the tube.

2. A method according to claim 1, further comprising, prior to evacuation of the tube, determining the predetermined period of time with respect to the evacuation step.

3. The method according to claim 2 wherein the method of determining the predetermined period of time includes measuring a pressure of working fluid within the tube, and determining when the pressure of the working fluid becomes constant.

4. The method according to claim 1 wherein applying a vacuum to the open end of the tube comprises:

connecting a vacuum pump to the open end of the tube, such that the vapor trap is interposed between the vacuum pump and the open end of the tube.

5. The method according to claim 1, wherein the working fluid is water.

6. The method according to claim 1, further comprising: cleaning the inner surface of the tube.

7. The method according to claim 1, wherein sealing the tube, comprises:

closing the open end to form a sealed heat pipe.

8. An apparatus for manufacturing a wickless heat pipe, the apparatus comprising a tube having an open end and an opposite closed end, a vacuum pump connected to the open end of the tube, and a vapour trap interposed between the vacuum pump and the open end of the tube, and weighing means, wherein the heat pipe is filled with a predetermined volume of working fluid and wherein the weighing means is adapted to weigh the tube before the tube is filled with the predetermined volume of working fluid, and to re-weigh the tube after the tube is filled with the predetermined volume of working fluid, and after the vacuum pump is used to evacuated the tube.

9. An apparatus for manufacturing a heat pipe according to claim 8, wherein the working fluid is water.

10. An apparatus according to claim 8 further comprising a pressure gauge operatively connected to the apparatus and adapted to measure a pressure within the tube.

11. A method for constructing a wickless heat pipe, comprising the steps of:

providing a tube having an open end and an opposite closed end;

filling the tube with a predetermined volume of working fluid;

connecting a vapor trap to the open end of the tube;

evacuating the tube by applying a vacuum to the open end of the tube for a predetermined period of time to remove non-condensable gases from the tube;

sealing the tube;

weighing the tube after filling the tube with a predetermined volume of working fluid and before evacuating the tube;

re-weighing the tube after evacuating the tube; and recording the mass of vaporized working fluid lost during evacuation of the tube;

wherein the method further comprises, prior to the evacuation of the tube, determining the predetermined period of time with respect to the evacuation step, and wherein the method of determining the predetermined period of time includes measuring a pressure of the working fluid within the tube, and determining when the pressure of the working fluid becomes a constant.

12. An apparatus for manufacturing a wickless heat pipe, the apparatus comprising a tube having an open end and an opposite closed end, a vacuum pump connected to the open end of the tube, a vapor trap interposed between the vacuum pump and the open end of the tube, and a weighing means, wherein the heat pipe is filled with a predetermined volume of working fluid and wherein the weighing means is adapted to weigh the tube before the tube is filled with the predetermined volume of working fluid, and to re-weigh the tube after the vacuum pump is used to evacuate the tube, the apparatus further comprising a pressure gauge operatively connected to the apparatus and adapted to measure a pressure within the tube.

* * * * *